July 22, 1952 W. H. NORTON ET AL 2,604,506
CLAMP LOCK FOR SEPARABLE SOCKET ASSEMBLIES
Filed May 13, 1949 2 SHEETS—SHEET 1
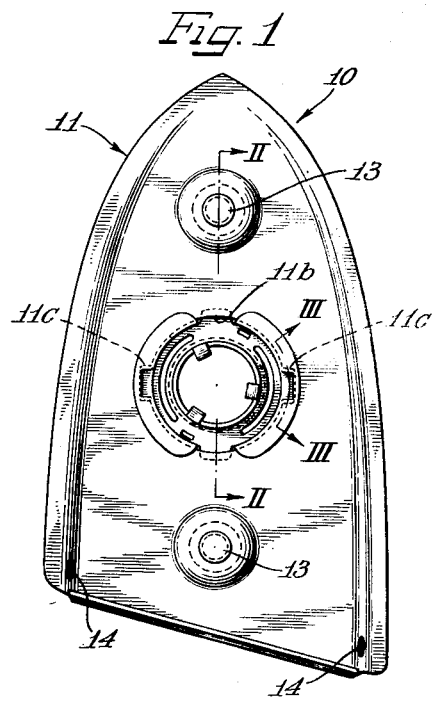
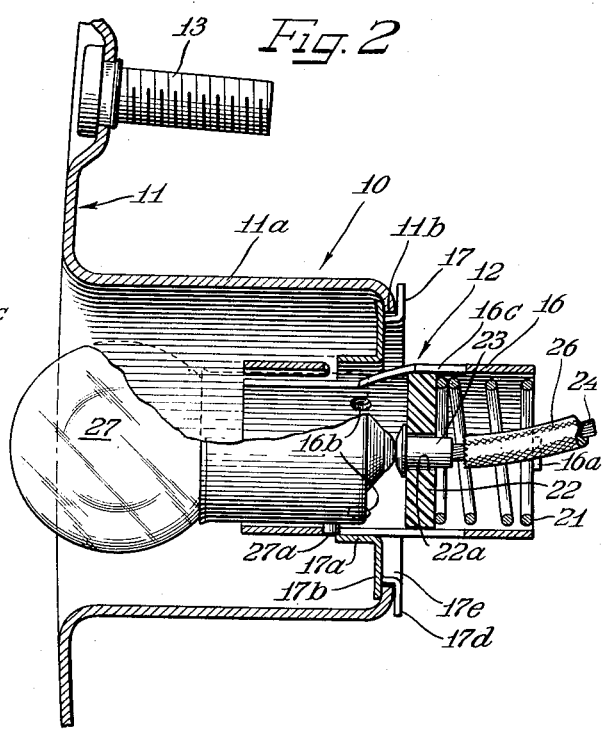
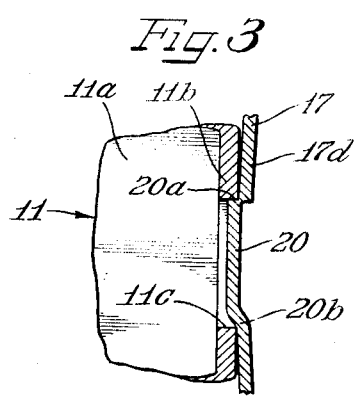
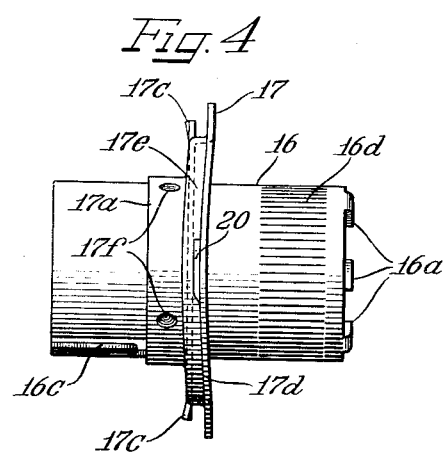
*Inventors*
*Wilbur H. Norton &*
*Hermann Geiger*
by The Firm of Charles W. Hill Attys July 22, 1952 W. H. NORTON ET AL 2,604,506
CLAMP LOCK FOR SEPARABLE SOCKET ASSEMBLIES
Filed May 13, 1949 2 SHEETS—SHEET 2
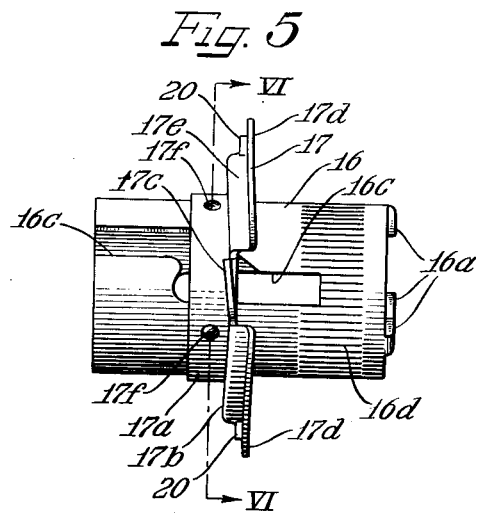
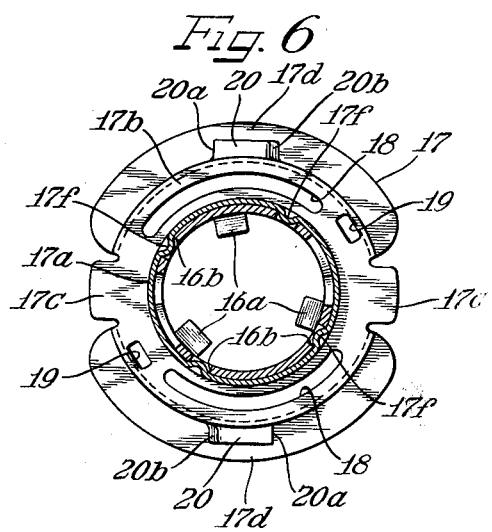
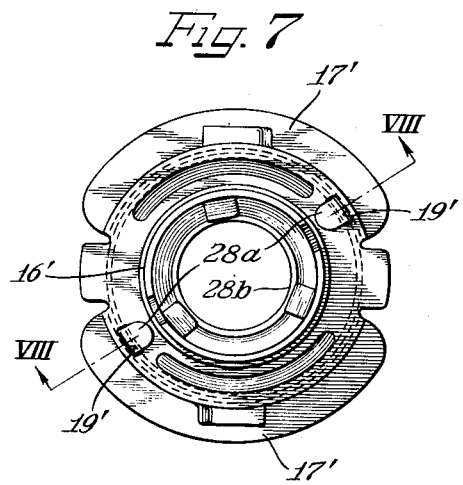
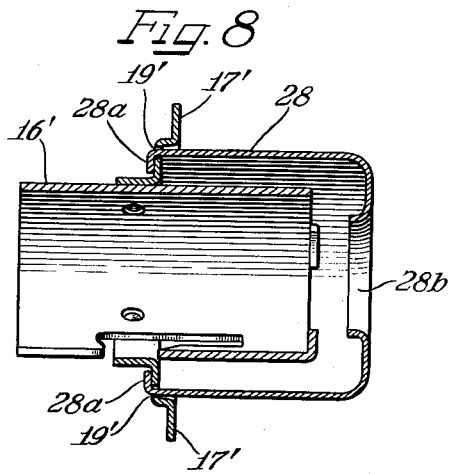
Inventors
Wilbur H. Norton &
Hermann Geiger
By The Firm of Charles W. Hills Attys Patented July 22, 1952

2,604,506

UNITED STATES PATENT OFFICE 2,604,506

CLAMP LOCK FOR SEPARABLE SOCKET ASSEMBLIES

Wilbur H. Norton and Hermann Geiger, Bronson, Mich., assignors to Kingston Products Corporation, Kokomo, Ind., a corporation of Indiana Application May 13, 1949, Serial No. 93,103

8 Claims. (Cl. 173—339)

This invention relates generally to a separable socket assembly of the type used for housing an electric light employed as a warning light on vehicles such as automobiles and the like.

One of the measures of the degree of utility achieved by a durable socket assembly is the ease with which the plug element may be assembled and removed from the socket receptacle. The type of assemblies heretofore provided have, therefore, represented a compromise between the necessity of providing complicated locking elements which are long lasting and durable and the less durable type of element which may be advantageously employed in a separable socket assembly to effect quick removal of a plug element for re-lamping and other purposes.

An object of this invention is to provide a novel and improved socket assembly which is made of a minimum number of simple elements arranged in such a manner as to effectuate a separable socket assembly of a rugged and long-lasting character but in which the plug element may be easily assembled in firm locked together relationship and quickly removed for servicing when so desired.

Another object of the present invention is to provide a highly simplified plug element for a separable socket assembly having a unique locking plate capable of obtaining a progressive leverage resilient purchase upon the slotted circular lip of a receptacle and which may be securely locked thereto when selectively positioned.

A further object of this invention is to provide a socket assembly which is made of simplified metal stampings and which may be produced economically to form a durable and efficient structure.

Many other advantages and objects of the present invention will become manifest to those versed in the art upon making reference to the detailed description which follows and the accompanying drawings, in which:

Figure 1 is a front elevational view of a socket assembly incorporating the principles of our invention;

Figure 2 is a cross sectional view, greatly enlarged and partly broken away taken on line II—II of Figure 1;

Figure 3 is a magnified fragmentary cross sectional view of a portion of a locking plate used in the present invention taken on line III—III of Figure 1;

Figure 4 is a side elevational view of a male plug element embodying the principles of our invention;

Figure 5 is a side elevational view of the plug element shown in Figure 4 but rotated through 90° to show additional details of construction;

Figure 6 is a cross sectional view taken on line VI—VI of Figure 5;

Figure 7 is an end elevational view of a modified plug element incorporating the principles of our invention; and Figure 8 is a cross sectional view taken on line VIII—VIII of Figure 7.

As shown on the drawings:

Referring first to Figures 1 and 2 a socket assembly is indicated generally by the reference numeral 10 and is shown as including a receptacle 11 and a plug element indicated generally by the reference numeral 12.

The receptacle 11, in this particular embodiment, may constitute the back wall of a tail-light fixture on an automobile or a directional turn indicator light of an automobile, or perhaps a combination of both. The receptacle 11 may be provided with mounting studs 13 and may be further provided with suitably threaded apertures as at 14 to receive machine screws holding a chromium plated lens holder (not shown) in firm assembly with the receptacle 11.

In this particular embodiment, the receptacle 11 is extruded at 11a so as to define a housing for a plug element 12. The housing portion 11a is preferably terminated by a circular lip 11b which may be suitably slotted or notched as at 11c on diametrically opposed points of the circular lip 11b (Figures 1 and 3).

Referring now to Figures 2 through 6, the plug element 12 is shown as including a plug body 16 and a locking plate 17.

The body 16 may be formed from a blank of steel which may be zinc or cadmium plated and as shown on the drawings includes three tabs or lugs 16a which are suitably located and bent over so as to lie in radially spaced relation when the body 16 is rolled into cylindrical form.

The body 16 is further provided with a plurality of spaced apertures 16b (Figures 2 and 6) the utility of which will be explained presently.

The body 16 also defines a pair of spaced J-notches 16c and may be knurled as at 16d to facilitate manipulation thereof.

The locking plate 17 is essentially an annulus or a ring-like element made of metal and shaped to define a hub portion 17a of the same inner diameter as the outer diameter of the cylindrical body 16, a radial flange 17b having a pair of radially spaced tongues 17c extending therefrom and a pair of spaced lip portions 17d which are offset from the flange portion 17b by a shoulder 17e.

It is conceivable that the plug element 12 could be fabricated in various ways, however, a particularly simple method of making the plug element 12 is to place the preformed cylindrical body 16 in a suitable jig and arrange the separate locking plate 17 in such a manner as to permit an end press die to upset portions of the hub 17a into the spaced apertures 16b as at 17f (Figures 4, 5 and 6) thereby placing the locking plate 17 and the body 16 into firm assembly with one another.

Particular reference may be had to Figures 4 and 5 in connection with a special feature of the present invention. It will be noted that the lip portions 17d are bowed along a curvilinear path to define a predetermined curvature. Thus, the included distance comprising the actual dimension of the offset between the tongue 17c and the lip portion 17d varies at points along the circumferential periphery of the locking plate 17. This feature, in effect, produces a progressive leverage clamping action.

Reference to Figures 4 and 5 will also reveal that the tongues 17c are bent in such a manner as to define an acutely inclined angle relative to the planar surface developed by the radial flange 17b. Thus, as will be readily evident to those versed in the art, the relative positioning of the tongues 17c and the lip portions 17d serves to define converging throats which facilitate a firm clamping action on a lip placed therebetween.

As will be noted on Figure 6, the radially disposed flange portion 17b is characterized by one or more arcuate slots or perforations 18 which permit the impartation of a predetermined curvature to the lip portions 17d, thereby enhancing the resilient qualities of the locking ring 17.

The planar surface of the radially disposed flange portion 17b may also be perforated by a pair of spaced apertures indicated at 19 (Figure 6) to adapt the plug element 12 for a modification which will be explained presently in connection with Figures 7 and 8.

Making particular reference to the lip portions 17d of the locking plate 17, it will be noted that the lip portions 17d may be crimped to define a pair of spaced pawls 20 which are seatable in the slots or notches 11c provided in the lip 11b of the receptacle 11. Each of the pawls 20 is provided with a square shoulder as at 20a on one side and an inclined tapered portion as at 20b on the other side.

As will be seen on Figure 2, the plug element 12 may be provided with a resilient member 21 such as a spring or the like which is placed within the bore of the body 16 and is seated on the spring seating lugs 16a at one end thereof. An insulating core 22 made of a suitable non-conductive material is placed in abutting relationship to the resilient member 21 and is suitably apertured as at 22a to pass a button-type terminal 23 affixed to the end of a conductor 24 sheathed by an appropriate insulating material 26.

A bulb 27 having bayonets 27a extending from its base is turned into the J-slots 16c of the body 16 and is locked therein by virtue of the resilient bias of the resilient member or spring 21.

To effect assembly of the plug element 12 within the receptacle 11, the tongues 17c of the locking plate 17 are inserted through the slots or notches 11c of the receptacle 11. In this position respective corners of the tongues 17c and the end portions of the lip portions 17d will underlie and overlie the lip 11b of the receptacle 11 in such a manner as to permit a clockwise rotation of the plug element 12 relative to the receptacle 11.

As soon as the plug element 12 is angularly displaced by a clockwise rotative movement, the locking plate 17 will obtain a purchase or grip upon the lip 11b of the receptacle 11 by virtue of the clamping action between the tongue 17c and the lip portion 17d.

The converging throat feature previously described and the bowed characteristics of the lip portion 17d will tend to promote a gradually increasing or progressive clamping action upon the lips 11b.

This clamping action is promoted by virtue of the leverage which operates through the effective lever arm dimension between the edges of the tongues 17c and the highest point of curvature of the lip portions 17d.

It should also be noted that the crimped pawls 20 add to this particular effect inasmuch as they are located substantially at the highest point of curvature of the lip portions 17d and present a riding surface for the lip portions 17d as the plug element 12 is rotated relative to the receptacle 11.

When the plug element 12 is angularly displaced through a rotative movement of 90°, the pawls 20 will come in registry with the slots or notches 11c of the lip 11b formed in the receptacle 11. When this occurs, the lip portions 17d will snap inwardly and the pawls 20 securely lock the locking plate 17 to the lip 11b of the receptacle 11.

As will be most clearly evident upon making reference to Figure 3, further clockwise movement of the plug element 12 will be precluded by virtue of the abutting relationship of the square shoulder 20a formed on the ends of the pawls 20 and the walls of the slots or notches 11c formed in the lip 11b of the receptacle 11.

Therefore, to unseat the locking plate 17 from its locked-together position upon the receptacle 11, the plug element 12 must be turned counterclockwise with sufficient force to cause the pawls 20 to ride up upon the lip 11b over the inclined or tapered portion 20b formed on one end of each pawl 20. Separation of the plug elements 12 from the receptacle 11 may be easily accomplished by turning the plug element 12 counterclockwise through 90° and withdrawing from the receptacle 11.

Referring now to Figures 7 and 8 a modified plug element is shown which includes a locking plate 17' identical in all respects to the locking plate 17 and a body 16'. In this particular embodiment, the body 16' need not be provided with knurling as before inasmuch as a dust cap 28 is provided which encloses the end of the body 16'. A pair of spaced ears 28a are provided on the cap 28 which may be passed through the apertures 19' formed in the locking plate 17'. The ears 28a may be turned over to place the dust cap 28 in firm assembly with the plug element.

If desired, the surface of the dust cap 28 may be knurled to facilitate grasping thereof. The dust cap 28 may also be extruded as at 28b to define an aperture for passing an electric conductor therethrough.

It will be apparent that the addition of the dust cap 28 to the plug element is merely for the purpose of providing a structure which affords additional protection against dust and the elements and in nowise affects the operation of the socket assembly as previously described.

It will be evident to those versed in the art that we have described an extremely simple socket assembly made of a relatively few elements which are strong, durable, easy to manufacture, and which produce novel and improved functions when arranged in the manner described.

Although we have resorted to detail in the description of our invention for the sake of clarity, it will be readily understood that we do not propose to be limited thereby inasmuch as we have chosen to describe the specific embodiments herein provided by way of example only.

We claim as our invention:

1. A socket assembly comprising a receptacle having a notched mounting hole, a body, and a locking plate carried by said body, said locking plate formed from an integral piece of metal having a hub portion surrounding said body, a flanged planar area extending radially around said hub and terminating in a sharply turned axial shoulder, spaced tongues disposed on substantially a coplanar level with said flanged planar area and being angularly inclined relative thereto and bowed arcuate lips of substantial circumferential extent offset from said planar area and having pawl means in the medial portion thereof, said locking plate operative to resiliently purchase the edges of said mounting hole between said tongues and said arcuate lips and to lock thereto upon seating of said pawls in the notches of said mounting hole.

2. A plug element for a separable socket assembly of the type including a receptacle having a notched circular lip, said plug element having a plurality of spaced peripheral flange portions each of substantial circumferential extent bowed along a curvilinear path and tongues axially spaced therefrom and lying in a common plane, the configuration of said flange portions forming a surface curvature wherein the included dimension measured normal to said common plane between said common plane and separated points on the periphery of the flange portion varies, whereby a progressive clamping action may be obtained when said lip is passed between said bowed flange portions and said tongues.

3. A plug element for a separable socket assembly of the type having a receptacle having a notched circular lip, including radially disposed acutely inclined tongues receivable in the notches of said lip and spaced apart bowed peripheral flange portions axially offset from said tongues and curved to decrease the effective offset dimension from the plane of said tongues, said tongues and said bowed flange portions forming convergent throats for a progressive clamping purchase on the lip of said receptacle upon relative angular displacement of said plug element.

4. A plug element for a separable socket assembly of the type including a receptable having a notched circular lip, said plug element having a plurality of spaced peripheral flange portions bowed along a curvilinear path and tongues axially spaced therefrom and lying in a common plane, the configuration of said flange portion forming a surface of curvature wherein the included dimension measured normal to said common plane between said common plane and separated points on the periphery of said flange portion varies, whereby a progressive clamping action may be obtained when said lip is passed between said bowed flange portions and said bowed flange portions including spaced pawls seatable in said notches upon a predetermined angular displacement of said plug element relative to said receptacle.

5. A plug element for a separable socket assembly of the type having a receptacle defining a notched circular lip, including radially disposed acutely inclined tongues receivable in the notches of said lip and spaced bowed flange portions offset from said tongues and curved to decrease the effective offset dimension from the plane of said tongues, said tongues and said bowed flange portions together forming convergent throats for a progressive clamping purchase on the lip of said receptacle upon relative angular displacement of said plug element, said bowed flange portions including spaced pawls seatable in said notches upon a predetermined angular displacement of said plug element relative to said receptacle.

6. A locking plate for use with a separable plug element of a socket assembly, consisting of, an annulus made of metal and shaped to provide a radial flange having a pair of radially spaced tongues and a pair of spaced flange-like lip portions of substantial circumferential extent, said lip portions and said tongues being axially offset from one another, whereby said tongues may be inserted through the slots of a notched circular lip on a receptacle and said locking plate may be angularly displaced to obtain a clamping purchase with said lip, said radial flange having perforate slots formed radially inward of said lip portions and said lip portions being bowed towards said tongues and together therewith forming convergent throats, whereby said purchase will become progressively tighter upon displacement of said locking plate.

7. A separable plug element for a socket assembly comprising an annular ring having a pair of radially spaced tongues and a pair of spaced lip portions of substantial circumferential extent axially offset from said tongues, whereby said tongues may be inserted through the slots of a notched circular lip on a receptacle and said ring may be angularly displaced to obtain a clamping purchase with said lip, said annular ring having perforations formed radially inwardly directly adjacent said lip portions and said lip portions being bowed towards said tongues on a curvilinear path of predetermined curvature, and a pair of spaced pawls crimped on diametrically opposed portions of said lip portions seatable in said slots of said notched circular lip, the configuration of said lip portion forming a surface of curvature wherein the included dimension measured normal to the plane of said annular ring between said plane and separated points on the periphery of said lip portion progressively varies.

8. A locking plate for use with a separable plug element of a socket assembly comprising an annulus made of metal and shaped to provide a radial flange having a pair of radially spaced tongues and a pair of spaced axially offset lip portions of substantial circumferential extent, whereby said tongues may be inserted through the slots of a notched circular lip upon a receptacle and said locking plate may be angularly displaced to obtain a clamping purchase with said lip, said tongues being bent to define an acutely inclined angle relative to said flange, said radial flange having perforations formed radially inwardly directly adjacent said lip portions and said lip portions being bowed towards said tongues, said tongues together with said lip portions forming convergent throats, whereby clamping purchase will progressively increase upon displacement of said locking plate.

WILBUR H. NORTON.
HERMANN GEIGER.

REFERENCES CITED

The following references are of record in the file of this patent:

UNITED STATES PATENTS

| Number | Name | Date |
|---|---|---|
| 1,723,471 | Dunham | Aug. 6, 1929 |
| 1,905,471 | Kent | Apr. 25, 1933 |
| 2,272,688 | Catron | Feb. 10, 1942 |
| 2,278,385 | Watts | Mar. 31, 1942 |